Dec. 6, 1960 W. J. DIETZ, JR 2,963,039
PRESSURE REGULATOR
Filed Feb. 13, 1957

INVENTOR.
WILLIAM J. DIETZ, JR.
BY
Robert W. Ely
ATTORNEY

United States Patent Office 2,963,039
Patented Dec. 6, 1960

2,963,039

PRESSURE REGULATOR

William J. Dietz, Jr., Sauquoit, N.Y., assignor to The Bendix Corporation, a corporation of Delaware Filed Feb. 13, 1957, Ser. No. 639,896

6 Claims. (Cl. 137—494)

The present invention relates to the pressure regulation of a gas, such as air, and more particularly concerns a pressure regulator adapted to reduce in two stages the pressure of a gas which is supplied from a fixed-volume source.

Aircraft starters which burn fuel and air to provide gases for driving the starter turbine require a high flow of constant pressure air for a brief period of time. This air is supplied from a fixed-volume, high pressure source, such as an air bottle, so that the pressure regulator is receiving air which is decreasing in pressure. Since stable regulation is not always provided by existing pressure regulators, improved means for delivering this air at a consistent reduced pressure level is desired.

An object of the present invention is to provide an improved pressure regulator which delivers gas, from a fixed-volume, high-pressure source, at a constant reduced pressure level.

A further object is to provide an improved compact pressure regulator which reduces the pressure in two stages.

Another object is to provide a piston-type regulator having a central bore and therein a piston assembly comprised of a gas-operated actuating piston, a throttling sleeve covering peripheral inlet ports and a regulating valve piston having slots cooperaing with one end of the central bore.

Another object is the provision of an improved pressure regulator in which air is initially throttled by a sleeve covering inlet ports and is further reduced in pressure by a main regulating valve piston having inwardly-flared slots and further in which the sleeve and valve piston are connected so that less pressure reduction is effected simultaneously by the sleeve and valve piston when inlet pressure decreases.

Figure 1:
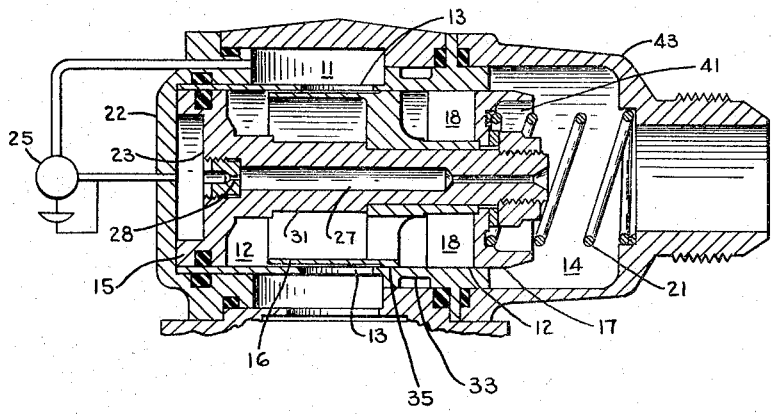
Figure 2:
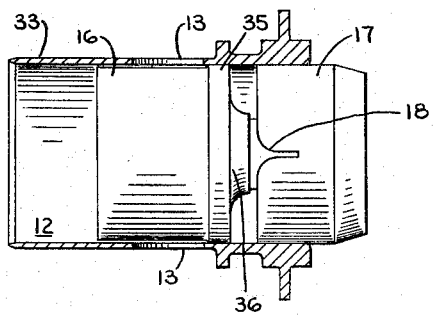

The realization of the above objects and others, along with advantages of the present invention, will be apparent from the following description and accompanying drawing in which:

Fig. 1 is cross-sectional view of a pressure regulator embodying the present invention and shows the piston assembly slidably mounted in an axial bore; and Fig. 2 is a view showing the relation of the throttling sleeve to the inlet ports in the tubular member providing the axial bore and the configuration of the slots in the valve piston.

The disclosed embodiment of the present invention is basically comprised of body means providing an annular supply chamber 11 about the intermediate part of the central cylindrical bore 12 which has intermediate inlet ports 13 and opens into an outlet chamber 14 and a gas-operated piston assembly having an actuating piston 15, a throttling sleeve 16 and a valve piston 17 which has inwardly-flared slots 18 and cooperates with the open end of the bore to form the main pressure regulating valve.

A spring 21 is positioned on a ledge in the outlet chamber and urges the piston assembly which is slidably mounted in the central bore 12 back against the end closure wall 22 at the left end of the regulator. The piston assembly is urged in the opposite direction against the spring 21 by pressurized gas admitted to the space back of the actuating piston 15 which has an outwardly facing recess 23. The actuating gas is provided by conduits connecting the annular supply chamber 11 to pressure regulator 25 (shown schematically) and connecting this regulator through end wall 22 to the space back of the actuating piston 15. Gas is prevented from passing the actuating piston by the seal in the periphery thereof. An axial bleed passage 27 having a restricted duct 28 of very small diameter extends through the axial shank 31 of the piston assembly and connects the recess 23 with the outlet chamber 14. This restricted axial passage 27 contributes to uniform operation by providing a bleed from the space back of the actuating piston and prevents overshoots of pressure. The central bore 12 is formed in a tubular member 33 which has the intermediately-located inlet ports 13 and terminates at the right in a transverse end, facing the outlet chamber, to form the open end of the central bore 12.

At the location of the four circular inlet ports 13 in the tubular member 33, the throttling sleeve 16 extends longitudinally and is in close proximity to the wall of the bore 12. The throttling sleeve 16 extends from the outer ring part 35 of the three-legged spider guide 36. The outer ring part 35 of the spider guide directs air rearwardly since the annular ring part slidably contacts the wall of the central bore 12. This guide is attached to the shank 31 and the spaces between the legs of the spider guide provide passages for the air which flows over the rear or inner edge of the throttling sleeve. The transverse distance (enlarged in the drawing for clarity) between the sleeve 16 and the wall of the bore 12 is such that air at 3000 p.s.i.g. will be reduced to about 2000 p.s.i.g. by the cross-sectional annular area which results. This distance in the illustrated embodiment actually is .002–.003 of an inch. It is to be noted that the sleeve 16 extends inwardly of the inner part of the circular inlet ports 13 and that the piston assembly will have to be moved an appreciable distance to the right before the inlet ports are even partially uncovered.

The valve piston 17 is attached to the right end of the shank 31 and is positioned in the open end of the bore 12 of the tubular member so that it partially extends into the outlet chamber 14. The valve piston has an outwardly facing cavity 41 which serves to retain the inner end of spring 21. The outer end of the spring is retained by the ledge in the reduced part of the tubular outlet member 43. The valve piston 17 has continuous peripheral surface which extends to the right and left from the transverse edge of the tubular member 33 so that air cannot flow from bore 12 into the outlet chamber 14 until the piston assembly is moved to the right, when the four slots 18 will establish a flow path. By reference to Fig. 2, it can be seen that slots 18 are sharply-flared inwardly. These uniformly dimensioned and spaced slots 18 are deep, having a depth of about two-thirds of the radius of the bore 12. The length of the slots is substantially equal to the depth of the slots. The inner uniformly-rounded edges of the diverging slots merge, after about a third of the length of the slots, into very narrow slots for the remaining two-thirds of the length. It is to be noted that the inwardly extending part of the throttling sleeve which is inwardly of the rear part of inlets 13 has a longitudinal length which is equal to the sum of the length of the continuous peripheral surface which is encased by the tubular member 33 and about two-thirds of the length of the slots. Stated differently, the sleeve 33 extends inwardly a distance from the inner part of the inlet ports 13 such that the inlet ports will not be appreciably uncovered until the beginning of the flared part of the slots is forward of the open end of the bore 12 or the transverse edge of the tubular member 33. With this arrangement, it is apparent, that the throttling sleeve does not function fully when the flared part of the slots is positioned to provide part of an unobstructed flow path. It is to be noted that the narrow part of the slots provides a gradually-increasing flow path and the addition of the flared part to the narrow part provides a rapidly-increasing flow path.

The operation of the disclosed regulator is believed apparent from the foregoing description and the drawing. Thus, high pressure air (initially at about 3000 p.s.i.g.) is admitted to the annular supply chamber 11 and actuating gas (at about 350 p.s.i.g.) is provided to the space back of the actuating piston 15 via pressure regulator 25. This moves the piston assembly to the right, opening slots 18.

Until thus actuated, the piston assembly remains as shown on the drawing due to spring 21 and the equal inner areas of the piston assembly which are affected by the high pressure air. Since the forces exerted on the inner surfaces are equal, adjustment of the pressure reducer 25 and the spring 21 provides for a predetermined pressure in the outlet passage.

Upon the piston assembly being actuated, high pressure air will flow through inlet ports 13 and will be throttled initially from 3000 p.s.i.g. to about 2000 p.s.i.g. by the narrow annular space or cross section between sleeve 16 and the bore 12. Thus, air is provided at a reduced pressure level for the main pressure regulation. This air flows through the passages of the spider guide and the slots into the outlet chamber. As the pressure in the outlet chamber approaches the control pressure applied to the left side of the actuating piston 15, the piston assembly slows down. When outlet pressure (about 300 p.s.i.g.) in the chamber 14, bolstered by the force of the spring 21, exceeds the force created by the control pressure on the left end of the actuating piston 15, motion of the piston assembly in the opposite direction occurs. This action reduces the opening of the slots 18 and reduces the output pressure. The throttling by the sleeve 16 provides gas at a lower pressure value to the main regulator and thus gives more stable regulation because less oscillation of the piston assembly occurs.

As the pressure in the high pressure bottle or other fixed volume source drops and hence the inlet pressure decreases so that less throttling and main pressure reduction is desired, the wider part of the slots provides a portion of a larger effective flow path and less throttling by sleeve 16 will be effected. Because of the arrangement between the sleeve and valve piston, the inlet ports 13 will be gradually uncovered at the same time as the flared and narrow parts of the slots provide the main regulating flow path. It is to be noted that the circular inlets as they are uncovered provide progressively wider outlets in a manner similar to the flared part of the slots.

In summary, it is to be appreciated that high pressure inlet air is throttled to a lower value through the space between the stationary valve chamber and the throttling sleeve which is integral with the main regulating valve piston. This throttling reduces the pressure to a value which gives more stable regulation of the output pressure. As the inlet pressure from the fixed volume source decreases, the resultant movement of the main regulating valve piston and the connected sleeve uncovers the inlet ports and the throttling effect is gradually reduced so that stable regulation is attained down to the minimum value of inlet air pressure. It is to be noted that the structural arrangement of the present invention gives a compact lightweight two stage pressure regulator.

It is to be understood that changes can be made in the disclosed embodiment of the invention by persons skilled in the art without departing from the invention as defined by the appended claims.

What is claimed is:

1. A pressure regulating valve comprised of a body structure providing an elongated central cylindrical bore and an annular air inlet chamber coaxial with, and intermediately surrounding, said bore; a plurality of equi-spaced circular inlet ports connecting said chamber and said bore; a cylindrical throttling sleeve within said central cylindrical bore extending inwardly beyond said circular inlet ports, said sleeve being spaced from the inner surface of said bore to form a restricted annular passage which is capable of appreciably reducing the pressure of a gas flowing therethrough; valve means cooperating with one end of said central cylindrical bore to provide first a gradually-increasing flow path and then a rapidly-increasing flow path, means yieldably urging said valve means to closed position; means connecting said throttling sleeve and said valve means so that said sleeve begins to uncover said inlet ports as said valve means begins to provide said rapidly-increasing flow path whereby less pressure reduction is obtained by said sleeve and by said valve means at the same time.

2. A pressure regulating device comprised of body means providing an elongated cylindrical bore and an annular gas supply chamber; said annular chamber being exteriorly of, and coaxial with, the intermediate part of said cylindrical bore; a plurality of uniformly-dimensioned and uniformly-spaced circular ports connecting said chamber and said bore; said bore being closed at one end by a transverse closure wall and open at its other end; said body means forming a circular transverse edge at said open end and a cylindrical outlet chamber extending from the open end of said bore; said outlet chamber having a diameter appreciably larger than said cylindrical bore; a piston assembly slidably mounted in said bore; said assembly including an actuating piston adjacent said closure wall, a valve piston at said open end, and an axially-extending shank connecting said pistons; said piston assembly further including a throttle device attached to said shank; said device having ring part slidably contacting a portion of the wall of said bore which is outward of said ports and inward of said valve piston; said device having an annular sleeve extending inwardly from said ring part and being slightly spaced from the wall of said bore; said device including radially-inner passageways for passing air from around the inner edge of said sleeve to said valve piston; said valve piston having an outer continuous peripheral surface; said peripheral surface extending inwardly and outwardly of said circular edge; slots in the inner part of said valve piston cooperating with said open end to form a flow path when said assembly is moved outward; said slots being outwardly very narrow for two-thirds of their length and inwardly-flared for one-third of their length; said annular sleeve extending inwardly beyond the inner part of said ports a length such that said ports will be completely covered until substantially all of the narrow portion of said slots is beyond the open end of said bore when said assembly is moved toward said outlet chamber.

3. A pressure regulating device comprised of body means providing an elongated cylindrical bore and an annular gas supply chamber; said annular chamber being exteriorly of, and coaxial with, the intermediate part of said cylindrical bore; a plurality of uniformly-dimensioned and uniformly-spaced circular ports connecting said chamber and said bore; said bore being closed at one end by a transverse closure wall and open at its other end; said body means forming a circular transverse edge at said open end and a cylindrical outlet chamber extending from the open end of said bore; said outlet chamber having a diameter appreciably larger than said cylindrical bore; a piston assembly slidably mounted in said bore; said assembly including an actuating piston adjacent said closure wall, a valve piston at said open end, and an axially-extending shank connecting said pistons; spring means in said outlet chamber urging said assembly inwardly so that said actuating piston is against said closure wall; said piston assembly further including a throttle device attached to said shank; said device having ring part slidably contacting a portion of the wall of said bore which is outward of said ports and inward of said valve piston; said device having an annular sleeve extending inwardly from said ring part and being slightly spaced from the wall of said bore; said sleeve device including radially-inner passageways for passing air from around the inner edge of said sleeve to said valve piston; said valve piston having an outer continuous peripheral surface; said peripheral surface extending inwardly and outwardly of said circular edge; slots in the inner part of said valve piston cooperating with said open end to form a flow path when said assembly is moved outward; said slots being elongated and having a uniform depth which is about equal to their length; said slots being outwardly very narrow for two-thirds of their length and inwardly flared for one-third of their length; said annular sleeve extending inwardly beyond the inner part of said ports a length such that said ports will be completely covered until the beginning part of the flared portion of said slots is at the open end of said bore when said assembly is moved outwardly; said sleeve and the wall of said bore forming an annulus of such size that air at 3000 p.s.i.g. will be reduced to air at about 2000 p.s.i.g.; and means for admitting a pressurized gas back of said actuating piston for moving said piston assembly against said spring means whereby high pressure gas from a fixed volume source is delivered to said outlet chamber at a predetermined reduced pressure level.

4. A pressure regulating device comprised of body means providing an elongated cylindrical bore; a plurality of ports intermediate its ends opening into said bore; said bore being closed at one end by a transverse closure wall and open at its other end; said body means forming a circular transverse edge at said open end and a cylindrical outlet chamber extending from the open end of said bore; said outlet chamber having a diameter appreciably larger than said cylindrical bore; a piston assembly slidably mounted in said bore; said assembly including an actuating piston adjacent said closure wall, a valve piston at said open end, and an axially-extending shank connecting said pistons; said piston assembly further including a throttle device attached to said shank; said device having an annular sleeve extending inwardly over said ports and being slightly spaced from the wall of said bore to form a throttling annulus; said valve piston having an outer continuous peripheral surface; said peripheral surface extending inwardly and outwardly of said circular edge; spring means biasing said assembly to closed position for said valve piston; slots in the inner part of said valve piston cooperating with said open end to form a flow path when said assembly is moved outward; said slots being outwardly very narrow and inwardly-flared; said annular sleeve extending inwardly beyond the inner part of said ports a length such that said ports will be completely covered until substantially all of the narrow portion of said slots is beyond the open end of said bore when said assembly is moved toward said outlet chamber.

5. In a pressure regulator, the combination comprised of means forming an elongated cylindrical chamber with intermediate inlet ports, a valve piston slidably arranged in an open end of said chamber and spring-biased in closed position, said valve piston having inwardly-flared, narrow slots in the inner part of the sides thereof cooperating with said open end of the chamber for regulating pressure, an annular throttling sleeve in said chamber extending over said inlet ports and in close proximity thereto and cooperating with the wall of said chamber to form a throttle annulus, and means operatively connecting said throttling sleeve to said piston for movement therewith so that said throttle annulus is operative as said slots initially regulate and further so that part of said inlet ports are gradually uncovered by said throttling sleeve as the inner and wider flared part of said slots provides an increasingly unobstructed flow path.

6. A pressure regulator comprised of body structure providing a cylindrical bore; said bore having a valve end and inlet ports spaced from said valve end; a valve piston slidably arranged in said valve end and having inwardly-flared pressure-regulating side slots; spring means biasing said valve piston to closed position; an annular throttling sleeve extending inwardly beyond said inlet ports and being spaced from the surface of said bore to form a restricted annular throttling passage from said inlets inwardly to the interior of said bore; means connecting said piston and said throttling sleeve so that, when the narrow outer parts of said valve piston slots provide a flow path, said annular throttling sleeve provides initial throttling; said sleeve further being arranged so that said inlet ports are gradually uncovered as the inner parts of said slots provide a flow path.

References Cited in the file of this patent

UNITED STATES PATENTS

| | | |
|---|---|---|
| 494,217 | Miles | Mar. 28, 1893 |
| 987,898 | McCurry | Mar. 28, 1911 |
| 1,069,188 | Saefke | Aug. 5, 1913 |
| 1,177,085 | Atkins | Mar. 28, 1916 |
| 2,731,033 | Cable | Jan. 17, 1956 |